R. DIXON.
PLOW.
APPLICATION FILED AUG. 25, 1917.

1,257,818.

Patented Feb. 26, 1918.
2 SHEETS—SHEET 1.

WITNESSES
J. T. L. Wright
Wm. Bagger

INVENTOR
Robert Dixon
BY Victor J. Evans
ATTORNEY

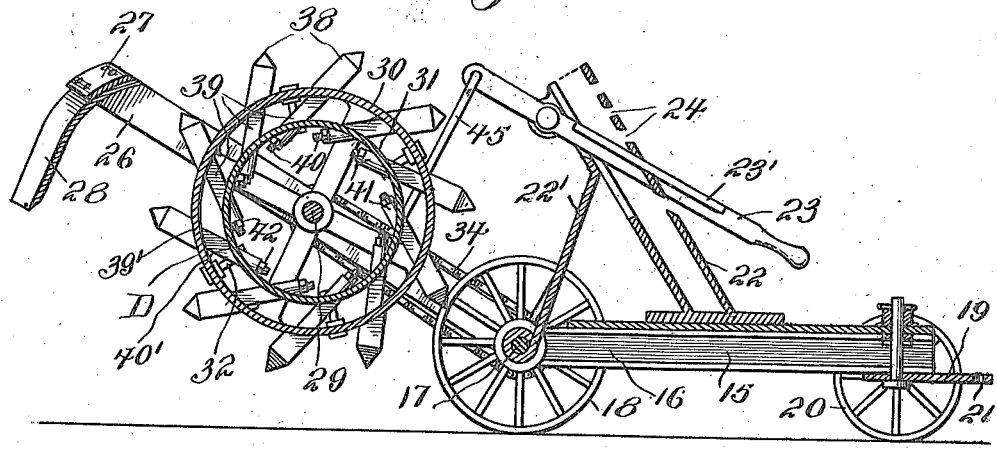

UNITED STATES PATENT OFFICE.

ROBERT DIXON, OF ARMELLS, MONTANA.

PLOW.

1,257,818. Specification of Letters Patent. Patented Feb. 26, 1918.

Application filed August 25, 1917. Serial No. 188,136.

*To all whom it may concern:*

Be it known that I, ROBERT DIXON, a citizen of the United States, residing at Armells, in the county of Fergus and State of Montana, have invented new and useful Improvements in Plows, of which the following is a specification.

This invention relates to soil tilling machines of that class or type which are generally known as rotary plows.

The invention has for its object to produce a rotary plow of simple and improved construction which will be adapted to be drawn by a tractor as well as by animal power and which will be provided with simple and effective means whereby the plow carrying frame may be elevated or adjusted to meet any conditions that may arise.

A further object of the invention is to simplify and improve the construction of the rotary plow cylinder and the manner of connecting the teeth or ground engaging implements therewith.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:

Fig. 3 is a longitudinal sectional view taken on the line 3—3 in Fig. 1.

Fig. 4 is a transverse sectional view taken through the cylinder on the line 4—4 in Fig. 1.

Fig. 5 is a perspective detail view of a portion of the cylinder and one of the ground engaging implements.

Corresponding parts in the several figures of the drawings are denoted by like characters of reference.

Figure 1:
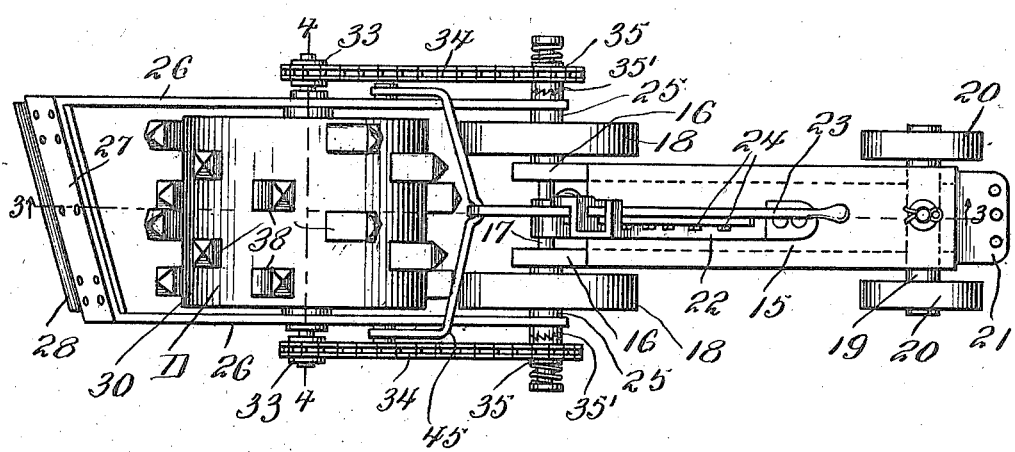
Figure 1 is a top plan view of a rotary plow constructed in accordance with the invention.

15 designates an elongated platform which is provided with rearwardly extending brackets 16 affording bearings for the rear axle 17 having ground wheels 18. The forward end of the platform is supported on a steering truck 19 having wheels 20 and provided also with a forwardly extending draft plate 21 to which the draft may be hitched in any convenient manner. On the platform 15 is an upright 22, the same being inclined rearwardly to such an extent that its upper end will overhang the rearward end of the platform, said upright being reinforced by a brace 22'. Fulcrumed on the upright 22 near the upper end thereof is a lever 23 and the upright is provided with notches 24 within one of which a flange 23' formed on the lever may be placed in engagement for the purpose of retaining said lever in position at various adjustments thereof.

Figure 2:
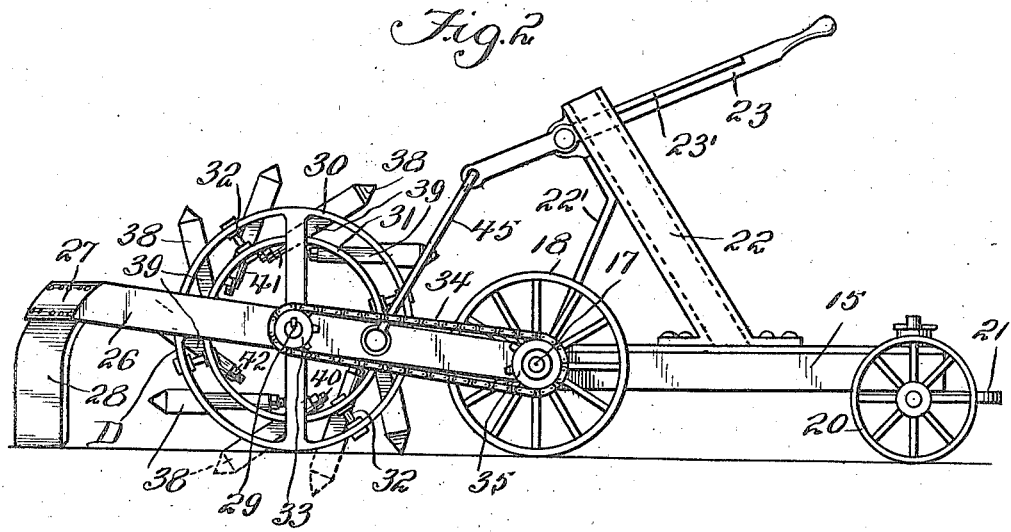
Fig. 2 is a side elevation of the same.

The axle 17 is extended beyond the outer faces of the ground wheels 18 to produce spindles 25 on which are pivoted the side members 26 of a plow carrying frame which, in addition to said side members, includes a rear cross bar 27 with which a dirt shield 28 is connected. The side members 26 afford bearings for a shaft 29 carrying a drum D comprising outer and inner concentric cylinders 30, 31, said cylinders being connected together and spaced apart by connecting members or braces 32. The shaft 29 is provided with sprocket wheels 33 which are connected by transmission chains 34 with sprocket wheels 35 on the rear axle 17 from which motion will thus be transmitted to the drum when the machine is in operation. Clutch devices, conventionally indicated at 35' in Fig. 1, may be included in the transmission, but such clutch devices are well known and do not require extended description. A lifting yoke 45 carried by the lever 23 has its limbs terminally pivoted on the drum carrying frame members 26. The outer and inner cylinders of the drum are provided with apertures 36, 37, said apertures being arranged in staggered relation, as clearly seen in Figs. 2 and 3, and said apertures 36 being preferably of square, rectangular or other non-circular formation, while the apertures 37 may be circular, as shown. The blades or diggers 38, which may be of any desired conformation, according to the nature of the soil that is to be operated upon, are each provided with a shank 39, the cross section of which conforms to the shape of the apertures 36, each shank having a threaded extension 40 for engagement with one of the apertures 37. It will be seen that at the juncture of the tooth with the shank, and likewise at the juncture of the shank with the threaded extension, inclined or obliquely disposed shoulders 39', 40' are formed in such a manner that said shoulders will abut externally on the respective cylinders, the threaded extension being provided with a suitable washer 41 and with a nut 42 that is tightened against the inner face of the inner cylinder 31. The diggers will thus be secured in position very firmly and securely, and the shank portions thereof will constitute braces, approximately tangential to the inner cylinder 31, whereby the inner and outer cylinders are connected and spaced apart in such a manner as to insure the outer cylinder against collapsing. It will also be seen that by the construction described, the diggers may be readily exchanged or replaced when needed.

It will be seen that by arranging the teeth or diggers in approximately tangential relation to the drum D, the said diggers, at the time of entering the ground, will occupy a substantially vertical or perpendicular position, thereby avoiding a breaking strain on the shanks of the diggers, and also obtaining more nearly a spading action than would be possible if the diggers were disposed radially with respect to the drum.

From the foregoing description, taken in connection with the drawings hereto annexed, the operation and advantages of this invention will be readily understood. When the machine is drawn over the ground, the plow carrying frame may be raised to a suitable position for transportation. When the plow carrying frame is lowered, the plow may be made to engage the ground at any desired depth, and the soil will be thoroughly agitated and pulverized by the teeth or diggers connected with the cylinder, which latter may be driven at a speed determined by the respective sizes of the sprocket wheels 33 and 35. The machine may be, of course, made in different sizes as may be found expedient, and adapted to be drawn by animal power or by a tractor, the latter being preferably utilized in the case of exceptionally large and heavy machines. The construction is simple and thoroughly effective for the purposes for which it is provided.

Having thus described the invention, what is claimed as new is:

In a machine of the class described, a drum supported for rotation and comprising inner and outer cylinders, said outer cylinder having non-circular apertures and said inner cylinder having circular apertures in staggered relation to the apertures in the outer cylinder, in combination with diggers each having a shank of non-circular cross section engaging an aperture in the outer cylinder, said shank being provided with an externally threaded extension engaging an aperture in the inner cylinder, said shank having obliquely disposed shoulders engaging the external faces of the respective cylinders, a nut and washer on the threaded extension tightened against the inner face of the inner cylinder and said diggers being arranged in approximately tangential relation to the drum.

In testimony whereof I affix my signature.

ROBERT DIXON.